E. R. VIBERG.
BRAKE LEVER.
APPLICATION FILED APR. 30, 1915.
1,173,067.
Patented Feb. 22, 1916.
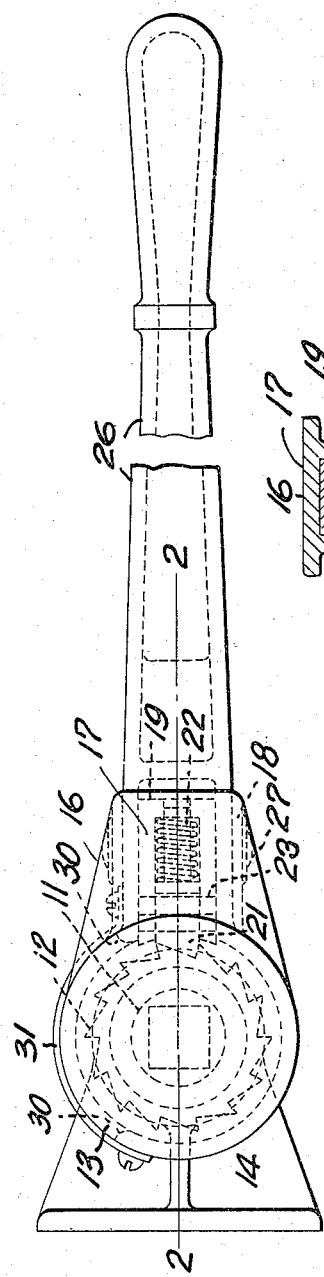
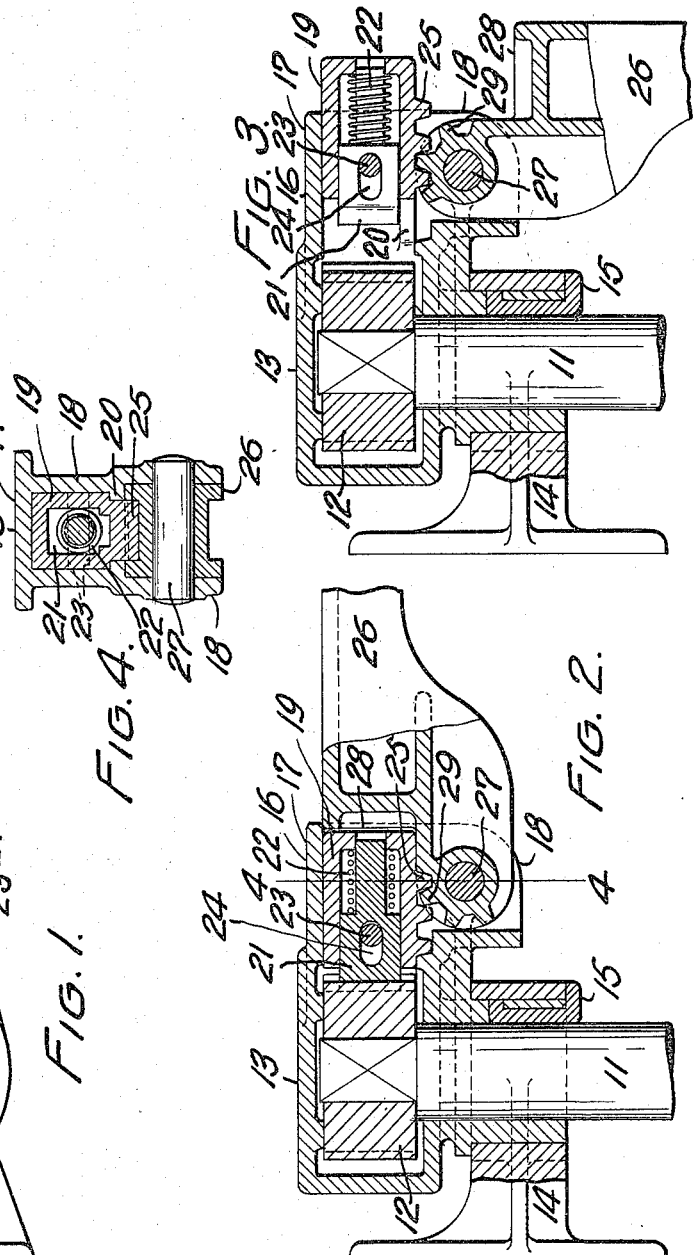
Witnesses
Inventor
E. R. Viberg
By
Attorneys

UNITED STATES PATENT OFFICE.

ERNEST R. VIBERG, OF MONTREAL, QUEBEC, CANADA.

BRAKE-LEVER.

1,173,067.

Specification of Letters Patent.

Patented Feb. 22, 1916.

Application filed April 30, 1915. Serial No. 24,971.

*To all whom it may concern:*

Be it known that I, ERNEST R. VIBERG, a citizen of the Dominion of Canada, and resident of the city of Montreal, in the Province of Quebec and Dominion of Canada, have invented certain new and useful Improvements in Brake-Levers, of which the following is a full, clear, and exact description.

This invention relates to improvements in levers for brakes, and is particularly designed for use on passenger cars or wherever limited space renders the ordinary hand wheel undesirable.

The object of the invention is to provide a simple, inexpensive and durable lever, which will be automatically disconnected from the ratchet wheel when lowered.

A further object is to provide a brake lever in which the disconnection of lever and ratchet takes place at the very commencement of the lowering movement.

The device consists essentially of a revoluble housing inclosing the ratchet wheel, and having a toothed pawl carrier therein, and a lever pivoted in the housing having an integral pinion meshing with the teeth of the pawl carrier.

In the drawings which illustrate the invention:—Figure 1 is a plan view of the device. Fig. 2 is a section on the line 2—2, Fig. 1. Fig. 3 is a view similar to Fig. 2 showing the handle in lowered position. Fig. 4 is a cross section on the line 4—4, Fig. 2.

Referring more particularly to the drawings, 11 designates a polygonal ended winding spindle of a hand brake, having a ratchet wheel 12 mounted on its upper end and inclosed in a housing 13, revolubly mounted on the spindle and revoluble within a supporting bracket 14, to which it is held by a gib 15. The housing 13 is provided with a radial extension 16, comprising a top wall 17, and parallel side walls 18 extending a suitable distance below the body of the housing. In the upper part of the extension 16 a hollow block 19 forming a pawl carrier is slidably mounted, and held against downward displacement by inwardly projecting ribs 20 of the side walls. A pawl 21 is slidably mounted in the block 19, and is normally pressed toward the ratchet wheel by a spring 22 held in compression between the pawl and carrier. The pawl is held against displacement from the carrier by a pin 23, fixed in the carrier and passing through a slot 24 in the pawl, this slot being of sufficient length to permit retreat of the pawl during reverse movement of the ratchet. The carrier is provided on its lower surface with suitable teeth 25.

The lever 26 which is of any suitable form is pivotally mounted at one end between the depending portions of the side walls 18 by means of a pin 27, the extremity of the lever projecting under the carrier while a shoulder 28 of the lever abuts the rear end of the carrier. The lever is provided around the pin 27 with circularly pitched teeth 29, adapted to mesh with the teeth 25 of the carrier.

This invention also includes a novel and inexpensive method of inserting and securing the ratchet. One side of the housing is provided with an opening 30, through which the ratchet may be introduced, this opening having a cover plate 31 secured in any suitable manner.

The assembly of the device is very simple. The ratchet is inserted in the housing and the housing in the bracket 14, where it is secured by insertion of the gib 15. The spindle 11 is then passed up through the housing into the ratchet, which its polygonal end engages, so that the two are irrevolubly connected. The spindle also holds the gib against displacement, which gib in turn holds the housing in the bracket. It will thus be seen that the spindle 11 is the key of the whole assembly. This method of constructing and assembling is found to be much less expensive than the forms in general use, and has the great advantage of being so locked together that it cannot be tampered with by idle or malicious persons.

The operation of the device is extremely simple. Assuming the lever to be raised into operative position, as shown in the drawings, when the same is moved in either direction, it oscillates with it the housing 13 to which it is pivotally attached, thus moving the pawl carrier and pawl within the housing. During movement in one direction, the pawl engages the abrupt faces of the ratchet teeth in the well known manner, and causes rotation of the spindle 11, while during movement in the reverse direction, the pawl slips over the ratchet teeth, sliding back in the carrier to pass each tooth. When the lever is not in use, it is allowed to drop to a position parallel with the spindle 11. At the commencement of this movement, the rack and pinion connection between the lever and pawl carrier retracts the carrier, so that the pawl disengages the ratchet. The continued lowering of the lever continues the retraction of the carrier, but the essential feature is that the pawl and ratchet are disconnected at the very commencement of the lever movement and during a very small proportion thereof. There is no holding mechanism for the lever, so that when released, it will drop, disconnecting the pawl and ratchet, so that if the brake is tightened to any degree and an accidental blow to the holding pawl releases same, the ratchet will rotate without imparting movement to the housing or lever.

Having thus described my invention, what I claim is:—

1. In a device of the character described, the combination with a spindle and a ratchet thereon, of a housing revoluble on the spindle inclosing said ratchet, a lever pivoted to said housing, a pawl within the housing, a carrier therefor, and a constantly engaging connection between the lever and carrier arranged to disconnect the pawl and ratchet on downward movement of the lever.

2. In a device of the character described, the combination with a spindle and ratchet thereon, of a housing revolubly mounted on the spindle and inclosing the ratchet, a lever pivoted to said housing, a pawl carrier slidable in the housing, a pawl slidable in the carrier independent of the position thereof sufficiently to clear the ratchet teeth, and rack and pinion connection between the lever and carrier.

3. In a device of the character described, the combination with a spindle and ratchet thereon, of a housing inclosing the ratchet revoluble on the spindle, a pawl carrier radially slidable in the housing, a slotted spring pressed pawl in said carrier, a pin on the carrier traversing the pawl slot, straight pitched teeth on the underside of said carrier, a lever pivotally mounted in the housing for movement in the same vertical plane as the carrier, circularly pitched teeth surrounding the pivotal point of said lever and meshing with the carrier teeth.

4. In a device of the character described, the combination with a spindle and ratchet thereon, of a housing inclosing the ratchet and revoluble on the spindle, a pawl engaging the ratchet, a carrier therefor, a lever pivoted to the housing, and rack and pinion connection between the lever and carrier.

5. In a device of the character described, the combination with a spindle and ratchet thereon, of a housing inclosing the ratchet and revoluble on the spindle, a pawl in said housing engageable with the ratchet, a carrier therefor, a lever pivoted to the housing under said carrier and movable vertically, and constantly engaging connecting means between the lever and carrier arranged to retract the carrier and disconnect the pawl and ratchet on downward movement of the lever.

6. The combination with a polygonal ended spindle and a bracket, of a housing revoluble in the bracket, a gib holding the housing against movement in the bracket in an axial direction, a ratchet inserted in the housing, said ratchet and gib being held against removal by the spindle, a lever arranged to revolve the housing around the spindle, and a pawl connecting the housing and ratchet during revolution in one direction.

In witness whereof, I have hereunto set my hand, in the presence of two witnesses.

ERNEST R. VIBERG.

Witnesses:
S. R. W. ALLEN,
G. M. MORELAND.

Copies of this patent may be obtained for five cents each, by addressing the "Commissioner of Patents, Washington, D. C."